United States Patent

Cornwall

[11] Patent Number: 4,583,565
[45] Date of Patent: Apr. 22, 1986

[54] FIRESTOP STACK FITTING AND COUPLING COMBINATION

[76] Inventor: Kenneth R. Cornwall, 902 Summit North, Atlanta, Ga. 30324

[21] Appl. No.: 555,121

[22] Filed: Nov. 25, 1983

[51] Int. Cl.$^4$ .............................................. E03D 1/00
[52] U.S. Cl. ........................................ 137/1; 137/75; 137/362; 285/64
[58] Field of Search ...................... 137/72, 74, 75, 362; 220/89 B, 88 R; 285/64; 138/89

[56] References Cited

U.S. PATENT DOCUMENTS

| | | | |
|---|---|---|---|
| 1,106,427 | 8/1914 | Taylor | 137/75 |
| 1,510,813 | 10/1924 | Williams | 137/75 |
| 1,956,858 | 5/1934 | Densten | 137/75 |
| 2,128,292 | 8/1938 | Finn | 137/75 |
| 4,136,707 | 1/1979 | Gaillet | 137/75 |
| 4,139,005 | 2/1979 | Dickey | 220/89 B |
| 4,313,286 | 2/1982 | Harbeke | 285/64 X |
| 4,360,041 | 11/1982 | Hagan | 138/89 |
| 4,453,354 | 6/1984 | Harbeke | 285/64 X |

FOREIGN PATENT DOCUMENTS 122515 10/1946 Australia ................ 137/362

Primary Examiner—Harold W. Weakley
Attorney, Agent, or Firm—Ian C. McLeod

[57] ABSTRACT

A stack fitting (10) and coupling (102) combination adapted to be mounted through a floor (104) in a building to prevent the spread of fire through pipe (100, 103) from below the floor is described. The fitting includes a thermally releasable plug (13) mounted in an extension conduit (12) from a main conduit (11) of the fitting which is activated by a fire to allow the plug to move into the main conduit. The fitting is particularly adapted for multi floor buildings where plastic pipe is to be used.

19 Claims, 4 Drawing Figures

FIRESTOP STACK FITTING AND COUPLING COMBINATION

BACKGROUND OF THE INVENTION

(1) Field

The present invention relates to a new firestop fitting and coupling combination for use in buildings which allows penetration of piping through floors without creating a fire path between the floors. In particular, the present invention relates to a fitting which includes plug means for the piping which is activated by the fire to prevent the spread of the fire between floors.

(2) Prior Art

Pipe penetrations through floors in multi-story buildings create a number of problems because a seal between the floors is broken by the pipe. The problem of fire safety when piping penetrates fire rated floors and walls is particularly troublesome, since these openings can jeopardize the fire integrity of the entire building. As a result in most buildings, plastic (PCV) pipe is not used, since fire can easily penetrate the floor by burning the pipe. A primary problem has been to develop a device which solves the fire safety problem associated with pipe penetrations so that plastic pipe can be used. The prior art has not provided a solution to this problem which is acceptable to fire marshalls, government officials, insurance companies and others.

OBJECTS

It is therefore an object of the present invention to provide a firestop fitting and coupling combination which allows the use of lightweight plastic pipe in buildings. Further it is an object of the present invention to provide a firestop fitting and coupling combination which is activated by the fire to create a seal between floors and which in normal use does not interfere with the primary fluid carrying function of the pipe. Further still, it is an object of the present invention to provide a firestop fitting and coupling which satisfies those people responsible for the safety of new building construction. These and other objects will become increasingly apparent by reference to the following description and the drawings.

IN THE DRAWINGS

GENERAL DESCRIPTION

Figures 1, 2:
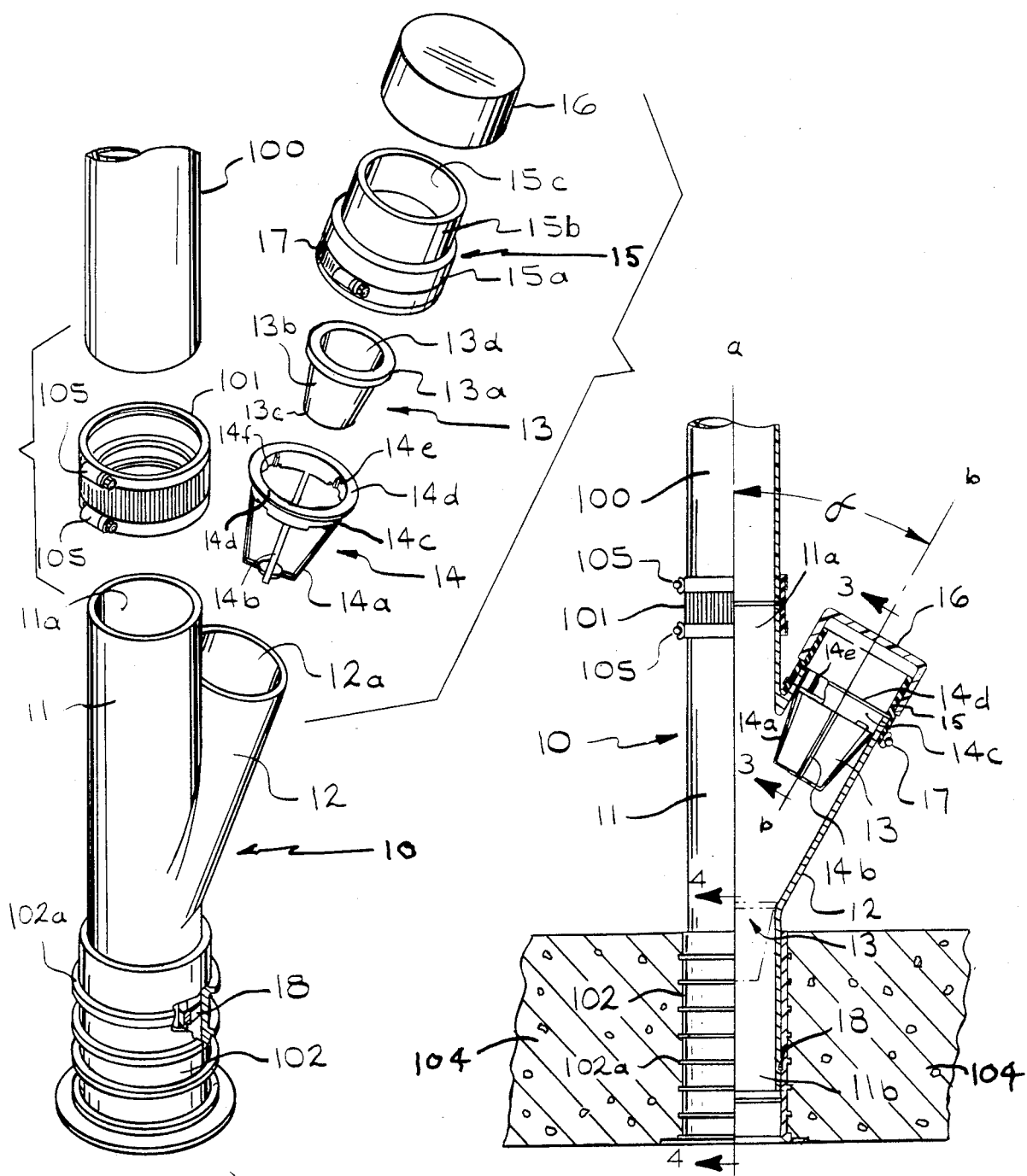
FIG. 1 is an isometric exploded view of the firestop fitting (10) and coupling (102), particularly showing the mounting of a thermally releasable plug (13) in an extension conduit (12) from a main conduit (11).
FIG. 2 is a front assembled view in partial section of the firestop fitting (10) and coupling (102) of FIG. 1, particularly showing an angle alpha between the main conduit (11) and extension conduit (12) and the fire activated or thermally released plug (13).
Figure 3:
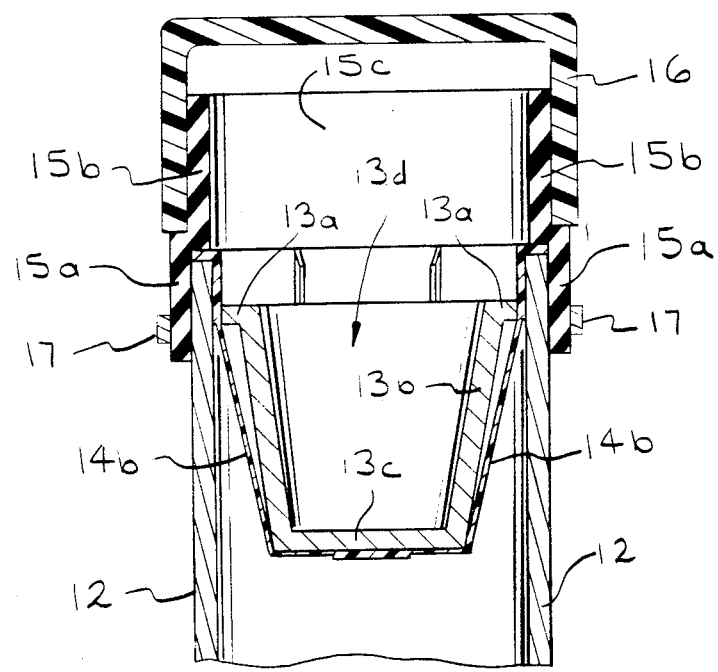
FIG. 3 is an enlarged partial front cross-sectional view of the releasable plug (13), harness (14), connector (15) and cap (16).

The present invention relates to a stack fitting (10) which prevents spread of fire between a floor of a building through a pipe which comprises:

(a) a non-flammable, fluid carrying main conduit (11) having a first longitudinal axis (a—a) between two opposed openings (11a, 11b) and adapted to be connected to vertically oriented fluid conduit pipes (100, 103) between floors in a building;

(b) a non-flammable extension conduit (12) from the main conduit positioned with a second axis (b—b) at an angle (alpha) from the longitudinal axis of the main conduit with an opening (12a);

(c) a non-flammable plug (13) mounted in the extension conduit so as to be releasable upon exposure to heat from a fire in the building to thereby move into and close the main conduit; and (d) closure means (15, 16) for the extension conduit opening.

Further the present invention relates to the method for preventing the spread of a fire between a floor in a building through a pipe which comprises:

(a) providing a separation in a vertically oriented pipe (100, 103) between a floor (104); and (b) mounting a stack fitting (10) in the separation and through the floor comprising a non-flammable, fluid carrying main conduit (11) having a first longitudinal axis (a—a) between two opposed openings (11a, 11b) connected to the vertically oriented fluid conduit pipes; a non-flammable extension conduit from the main conduit positioned with a second axis (b—b) at an angle (alpha) from the longitudinal axis of the main conduit with an opening (12a); a non-flammable plug (13) mounted in the extension conduit so as to be releasable upon exposure to heat from a fire in the building to thereby move into and close the main conduit; and closure means (15, 16) for the extension conduit opening.

Finally the present invention relates to a building construction which prevents spread of fires between a floor of the building through a pipe which comprises:

(a) a stack fitting including a non-flammable, fluid carrying main conduit (11) having a first longitudinal axis (a—a) between two opposed openings (11a, 11b) which is vertically oriented, a non-flammable extension conduit (12) from the main conduit positioned with a second longitudinal axis (b—b) at an angle (alpha) to the first axis with an opening (12a), a non-flammable plug (13) mounted in the extension conduit so as to be releasable upon exposure to heat from a fire in the building to thereby move into the main conduit, and closure means (15, 16) for the extension conduit opening;

(b) a floor mounting the main conduit of the fitting so as to convey fluid through the floor; and (c) fluid carrying pipe (100, 103) connected to both openings of the main conduit.

The stack fitting (10) and coupling (102) combination of the present invention provides a practical, effective system for preventing the spread of fire, smoke, and toxic fumes. The coupling (102) (usually composed of PCV) is embedded in a concrete floor (104) and mounts the stack fitting (10). The preferred couplings (102) are described in U.S. Pat. No. 4,261,598, issued May 27, 1981 and in application Ser. No. 500,538, filed June 2, 1983. The stack fitting (10) which penetrates the floor (104) with the coupling (102) is composed of cast iron, a non-combustible material.

The preferred operation of the plug (13) in the stack fitting (10) is very simple, usually relying upon gravity. To prevent a fire stack effect, a non-flammable cast iron plug (13) is released into the main conduit (11) of the stack fitting (10) by a thermally triggered release harness (14) which melts, preferably at approximately 250°

F. The released cast iron plug (13) wedges tightly into cast iron pipe main conduit (11) penetrating the floor (104) and completely prevents flame spread to plastic pipe (100) above the stack fitting. The following is a detailed description of the preferred stack fitting (10) and coupling (102) combination of the present invention.

SPECIFIC DESCRIPTION

Figure 4:
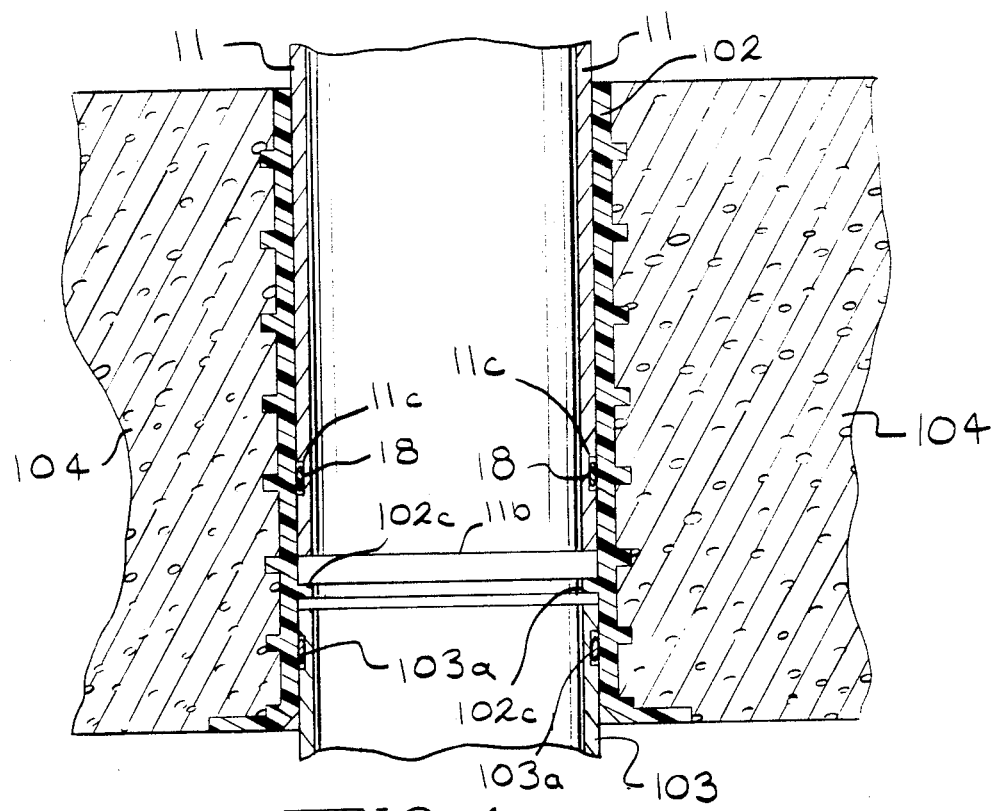
FIG. 4 is an enlarged partial front cross-sectional view of a coupling (102) and part of the main conduit (11) of the fitting (10).

Coupling—As shown in FIGS. 1, 2 and 4, the coupling 102, preferably composed of rigid PVC, is designed to be poured-in-place in the concrete floor or slab 104. It is preferably provided in various diameters of Type I PVC schedule 40 IPS DWV., conforming to U.S. Commercial Standard C.S. 272-65, ASTM 2665-74, FHA revision 31 to M.P.S., and supplied in heights corresponding to the depth of the concrete pour of the floor 104. A removable plastic cap (not shown) protects the coupling 102 during the concrete finishing process. Anchor rings 102a are molded in at one inch (2.54 cm) intervals on the exterior surface of the coupling 102. When the cast iron stack fitting 10 is inserted into the coupling 102, the plastic wall of the coupling 102 is sandwiched between the fitting 10 and the concrete floor 104, allowing it to withstand extremely high temperatures without melting or burning due to the lack of oxygen.

The coupling 102 serves three purposes in the stack fitting 10 and coupling 102 combination: (1) it provides a base for insertion and anchoring of the cast iron stack fitting 10; (2) it provides for solvent weld connection to PVC piping 103 below the fitting 10; and (3) the PVC is compatible with poured concrete floor 104 and will not rust or pull away.

Stack Fitting—The stack fitting 10 is shown in FIGS. 1 to 4. The fitting 10 includes a main conduit 11 and an extension conduit 12. The main conduit 11 includes openings 11a and 11b for fluid passage in normal use. The extension conduit 12 includes an opening 12a which serves to support a releasable plug 13. The plug 13 is in the shape of a hollow truncated cone and includes a ring 13a, a body 13b, an apex end 13c, and an opposite base end 13d. The plug 13 is mounted adjacent to opening 12a in extension conduit 12 by means of a terminal release harness 14. The integral harness 14 includes overlapping straps 14a and 14b and a holding ring 14c supported on opening 12a by lip 14d. The harness 14 includes retainers 14e which hold the plug 13 in place after the plug 13 is inserted in the harness 14. The harness 14 is held in place by means of a flexible connector 15 on the extension conduit 12 and closed by cap 16 mounted on the connector 15. The connector 15 is composed of elastomeric PVC and includes a collar 15a which fits over extension conduit 12 and is held in place by ring clamp 17. An integral reduced diameter collar 15b supports cap 16 and closes opening 15c. This connector 15 is described in my U.S. patent application Ser. No. 267,636, filed May 27, 1981.

A ring seal 18 is provided in groove 11c between the coupling 102 and the main conduit 11 of the fitting 10 to prevent fluid leakage. The opening 11b is spaced from the internal ring 102c of coupling 102 which allows the fitting 10 to be press fit into the coupling 102. Conventional pipe 103 is connected to the coupling 102 and can include a ring seal 103a. If the pipe 103 and coupling 102 are plastic they are usually joined by solvent welding.

The opposite opening 11a of the main conduit 11 is connected to piping 100 usually by means of standard ring clamps 105 around a rubber connector collar 101. This type of connection is well known to those skilled in the art.

The overall length of the fitting is preferably about 18 inches (37.7 cm), with the slightly larger internal diameter extension conduit 12 set at an angle alpha of 30 degrees from the vertical axis (a—a). The fitting is preferably made of gray cast iron in accordance with ASTM A-48 and design specification 474-75. The surface of the fitting is coated with SA 2702 Fire Protection Red heat resistant silicone coating.

Table 1 shows the preferred specifications for the iron portion of the stack fitting 10.

TABLE 1

| ASTM A - 48 Gray Cast Iron With Controlling Sections .25 + .50" ||
|---|---|
| Physical Properties | |
| Tensile Strength | 25,000 PSI Minimum |
| Brinnel Hardness | 160 to 212 |
| Chemical Composition | |
| Carbon | 3.30-3.60% |
| Silicon | 1.85-2.45% |
| Manganese | .40-.80% |
| Phosphorus | .15% Max. |
| Sulphur | .20% Max. |
| Microstructure | |
| Flake Graphite | Type A and B |
| Matrix | 60% to 100% Pearlite |
| | 10% Max. Fine, Evenly Distributed Carbides |
| | ⅛" Max. D Graphite at Thin Edges with Less Than 40% Carbides |
| | 10% Max. Steadite Outlining Original Austenite Grain Boundaries |

The plug 13 is spheroconically or truncated conically shaped and made of the same cast iron material as the main conduit 11 and extension conduit 12 of the fitting 10 previously described in Table 1. The plug 13 is sized to drop through the extension conduit 12 and into the main conduit 11 of the stack fitting 10, where the plug 13 lodges to block flame penetration and prevent the fire stack effect. The ring 13a of plug 13 is preferably about ¼ inch (0.6 cm) smaller in diameter than the internal diameter of the extension conduit and slightly larger by ¼ inch (0.6 cm) than the internal diameter of the main conduit 11. This allows the plug 13 to firmly lodge in the main conduit 11 upon release.

The thermal release harness 14 is preferably composed of either polyethylene or polypropylene, preferably the latter, and designed to hold the flamestop plug 14 in place in the extension conduit 12 of the stack fitting 10. Temperatures greater than 250° F. inside the fitting 10 will cause the harness 14 to break away and collapse, triggering release of the flamestop plug 13.

The pressure test cap 16 is composed of Type I PVC schedule 40 IPS DWV conforming to ASTM D-2466. The cap 16 closes the opening 12a of the extension conduit 12.

The connector 15 is preferably composed of flexible PVC and attaches to the PVC cap 16 and the cast iron extension conduit 12. The flexible connector 15 is solvent welded to the PVC cap 16 using IPS 795 weld-on cement and preferably includes a series 300 stainless steel ring clamp 17 to provide a compression joint with the cast iron extension conduit 12. The cap 16 and flexible connector 15 allow pressure testing of the system of pipes 102, 103 and fitting 10. The harness 14 includes slots 14f around the ring 14c to allow fluid to bypass the harness 14. The ring clamp 17 allows removal of the connector 15 for periodic inspection of the plug 13 and harness 14.

The O ring 18 is preferably composed of grade SCE-41 black neoprene/EPT/SBR blend conforming to ASTM D-1056-67. It provides a watertight seal between the stack fitting 10 and the coupling 102.

The angle alpha is preferably between about 10° and 45°. The angle is 30° as shown in FIGS. 1 and 2 is preferred to insure gravity feed of the plug 13 upon rupture of the harness 14. It will be appreciated; however, that various spring means (not shown) between the cap 16 and the plug 13 can be used to urge the plug into the main conduit 11; however, these are expensive and unnecessary.

In normal operation of the building, the stack fitting 10 functions as a leak proof fluid passage through the floor 104. When fire breaks out in the building on the lower side of floor 104, the pipe 103 melts if it is composed of PVC. This allows heating the iron main conduit 11 and extension conduit 12. When the temperature reaches 225° F. (106° C.) (which is well below normal flammability levels of PVC and most other plastic materials) the harness 14 ruptures and the plug 13 is released into the main conduit 11. The result is that the fire can not penetrate to the upper side of floor 104. Also the cap 16 and connector 15 can melt causing release of the plug 13 by melting the harness 14. Based upon Underwriters Laboratories (UL) Tests, the stack fitting 10 installed in the coupling 102 has been given a four (4) hour fire rating which is believed to be unprecedented in the building construction field.

As can be seen from the foregoing description, the present invention provides a unique device for the prevention of the spread of fire between floors of a building.

I claim:

1. A stack fitting which prevents spread of fire which comprises:
   (a) a non-flammable, fluid carrying main conduit having a first longitudinal axis (a—a) between two opposed openings and adapted to be connected to vertically oriented fluid conduit plastic pipe between floors in a building;
   (b) a non-flammable extension conduit from the main conduit positioned with a second axis at an acute angle (alpha) from the longitudinal axis of the main conduit with an opening;
   (c) a non-flammable plug mounted in the extension conduit on a plastic support provided in the extension conduit which is releasable by melting upon exposure of the support to heat less than necessary for heat destruction of the plastic pipe to which it is adapted to be connected through the main conduit from a fire in the building in which it is adapted to be oriented to thereby move the plug into and close the main conduit wherein the plastic support is provided by a harness with a strap upon which the plug rests, wherein the harness has two straps which are overlapping in an x pattern joined to a holding ring which is mounted in the extension conduit and wherein the strap is broken by heat from a fire to release the plug which moves by gravity into the main conduit; and
   (d) closure means for the extension conduit opening.

2. The fitting of claim 1 wherein the main conduit and extension conduit are integral, each having a circular internal cross-section and wherein the plug is shaped as a cone with a base and with a truncated apex positioned towards the main conduit.

3. The fitting of claim 2 wherein the plug has an integral ring adjacent the base having a diameter slightly smaller than the internal diameter of the extension conduit and larger than the main conduit.

4. The fitting of claim 1 wherein the straps and holding ring are integral.

5. The fitting of claim 1 wherein the holding ring is attached adjacent the extension conduit opening.

6. The fitting of claim 5 wherein the straps and holding ring are attached to the extension conduit by the closure means for the extension conduit opening.

7. The fitting of claim 6 wherein the closure means includes a flexible connector secured adjacent to the extension conduit opening by a ring clamp and a cap mounted on the connector.

8. The fitting of claim 1 wherein the second axis is at an angle (alpha) between about 10 and 45 degrees from the first axis so that when the first axis is vertical the plug will fall by gravity into the main conduit from the extension conduit upon release.

9. A building construction which prevents spread of fires between a floor of the building through a plastic pipe which comprises:
   (a) a stack fitting including a non-flammable, fluid carrying main conduit having a first longitudinal axis between two opposed openings which is vertically oriented, a non-flammable extension conduit from the main conduit positioned with a second longitudinal axis at an angle (alpha) to the first axis with an opening, a non-flammable plug mounted in the extension conduit on a plastic support provided in the extension conduit which is releasable by melting upon exposure of the support to heat less than necessary for heat destruction of the plastic pipe through the main conduit from a fire in the building to thereby move the plug into the main conduit wherein the plug in the fitting is mounted in the extension conduit by a harness as the plastic support which includes a strap upon which the plug rests, wherein two straps in the harness are overlapping in an x pattern and joined to a holding ring which is mounted on the extension conduit and wherein the strap is broken by heat from a fire to release the plug which moves by gravity into the main conduit, and closure means for the extension conduit opening;
   (b) a floor mounting the main conduit of the fitting so as to convey fluid through the floor; and
   (c) fluid carrying plastic pipe connected to both openings of the main conduit.

10. The building construction of claim 9 wherein the main conduit of the coupling is supported through the floor by a plastic coupling mounted through the floor into which a portion of the main conduit is sealed.

11. The building construction of claim 10 wherein the main conduit and the coupling are sealed with an o-ring between them.

12. The building construction of claim 9 wherein the fitting includes the main conduit and extension conduit which are integral each having a circular internal cross-section and wherein the plug is shaped as a cone with a base and with an opposite truncated apex pointed towards the main conduit.

13. The building construction of claim 12 wherein the plug in the fitting has an integral ring adjacent the base having a diameter slightly smaller than the internal diameter of the extension conduit and slightly larger than the main conduit.

14. The building construction of claim 9 wherein the straps and holding ring are integral.

15. The building construction of claim 9 wherein the holding ring of the harness is attached adjacent the extension conduit opening.

16. The building construction of claim 15 wherein the harness is attached to the extension conduit by the closure means.

17. The building construction of claim 15 wherein the closure means includes a flexible connector secured adjacent to the extension conduit opening by a ring clamp and a cap mounted on the connector.

18. The building construction of claim 9 wherein the second axis of the fitting extension conduit is at an angle of between about 10° and 45° to the first axis of the main conduit so that the plug will fall by gravity into the main conduit from the extension conduit upon release.

19. The method for preventing the spread of a fire between a floor in a building through a plastic pipe which comprises:
 (a) providing a separation in a vertically oriented plastic pipe between a floor; and
 (b) mounting a stack fitting in the separation and through the floor comprising a non-flammable, fluid carrying main conduit having a first longitudinal axis between two opposed openings connected to the vertically oriented pipes; a non-flammable extension conduit from the main conduit positioned with a second axis at an angle (alpha) from the longitudinal axis of the main conduit with an opening; a non-flammable plug mounted in the extension conduit on a plastic support provided in the extension conduit which is releasable by melting upon exposure of the support to heat less than necessary for heat destruction of the plastic pipe through the main conduit from a fire in the building to thereby move the plug into and close the main conduit wherein the plastic support is provided by a harness with a strap upon which the plug rests, wherein the harness has two straps which are overlapping in an x pattern joined to a holding ring which is mounted in the extension conduit and wherein the strap is broken by heat from a fire to release the plug which moves by gravity into the main conduit; and closure means for the extension conduit opening.

\* \* \* \* \*